(12) United States Patent
Rodriguez

(10) Patent No.: US 7,702,817 B2
(45) Date of Patent: Apr. 20, 2010

(54) WIRELESS NETWORK ACCESS TECHNOLOGIES FOR RETRIEVING A VIRTUAL RESOURCE VIA A PLURALITY OF WIRELESS NETWORK INTERFACES

(75) Inventor: Pablo R. Rodriguez, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 10/695,928

(22) Filed: Oct. 28, 2003

(65) Prior Publication Data

US 2005/0090283 A1 Apr. 28, 2005

(51) Int. Cl.
*G06F 15/16* (2006.01)
(52) U.S. Cl. .................... 709/249; 709/203; 709/217
(58) Field of Classification Search ............... 709/249, 709/250, 201–203, 217
See application file for complete search history.

(56) References Cited

U.S. PATENT DOCUMENTS

| | | | |
|---|---|---|---|
| 5,442,633 A | | 8/1995 | Perkins et al. |
| 5,530,963 A | | 6/1996 | Moore et al. |
| 5,625,877 A | | 4/1997 | Dunn et al. |
| 5,659,685 A | | 8/1997 | Williams et al. |
| 5,978,828 A | * | 11/1999 | Greer et al. .................. 709/224 |
| 6,314,108 B1 | * | 11/2001 | Ramasubramani et al. .. 370/465 |
| 6,947,444 B2 | * | 9/2005 | Heller ......................... 370/466 |
| 7,092,375 B2 | * | 8/2006 | Pitsoulakis .................. 370/338 |
| 7,263,555 B2 | * | 8/2007 | Banerjee et al. ............. 709/226 |
| 7,321,933 B2 | * | 1/2008 | Cheshire ..................... 709/227 |
| 7,519,740 B2 | * | 4/2009 | Kokkinen et al. ............ 709/250 |
| 2002/0087674 A1 | * | 7/2002 | Guilford et al. ............. 709/223 |
| 2003/0055975 A1 | * | 3/2003 | Nelson et al. ............... 709/227 |
| 2003/0074486 A1 | * | 4/2003 | Anastasiadis et al. ....... 709/321 |
| 2003/0208554 A1 | * | 11/2003 | Holder ........................ 709/217 |
| 2004/0068589 A1 | * | 4/2004 | Witkowski et al. .......... 709/249 |
| 2004/0085944 A1 | * | 5/2004 | Boehm ........................ 370/338 |
| 2004/0098511 A1 | * | 5/2004 | Lin et al. .................... 709/249 |
| 2004/0103204 A1 | * | 5/2004 | Yegin ......................... 709/229 |
| 2004/0111494 A1 | * | 6/2004 | Kostic et al. ................ 709/220 |
| 2004/0172476 A1 | * | 9/2004 | Chapweske ................. 709/231 |
| 2004/0198217 A1 | * | 10/2004 | Lee et al. ................... 455/3.01 |
| 2005/0071510 A1 | * | 3/2005 | Belimpasakis .............. 709/250 |
| 2005/0122997 A1 | * | 6/2005 | Bendelac et al. ............ 370/477 |
| 2005/0193131 A1 | * | 9/2005 | Bai et al. .................... 709/229 |

(Continued)

OTHER PUBLICATIONS

Pablo Rodriguez and Ernst W. Biersack, Dynamic Parallel Access to Replicated Content in the Internet, Aug. 2002, IEEE/ACM Transactions on Networking, vol. 10, No. 4, pp. 455-465.*

(Continued)

*Primary Examiner*—Saleh Najjar
*Assistant Examiner*—Oleg Survillo
(74) *Attorney, Agent, or Firm*—Collins & Collins Incorporated; L. Alan Collins

(57) ABSTRACT

Systems, methods, and computer program products for providing wireless network access are disclosed. A wireless network access device comprises at least one local communication network interface and a plurality of wireless network interfaces. Requests for resources are received over the local communication network interface, processed by the processor, and distributed among two or more of the plurality of wireless network interfaces. Algorithms for determining a number of wireless network interfaces and for selecting particular wireless network interfaces are disclosed. Received resources may be stored in a cache memory, and may be used to respond to subsequent requests for the same resource.

23 Claims, 6 Drawing Sheets

U.S. PATENT DOCUMENTS

2006/0010253 A1* 1/2006 Aiken et al. ............. 709/250
2006/0168224 A1* 7/2006 Midgley ................. 709/226
2007/0118670 A1* 5/2007 Viswanath et al. ......... 709/249

OTHER PUBLICATIONS

Kameswari Chebrolu, et al., Communication using Multiple Wireless Interfaces, 2002, IEEE, pp. 327-331.*

Cherry, Steven M.; "Pesky Home Networks Trouble Cable Behemoths" IEEE Spectrum, Apr. 2002, pp. 60-61.

Held, Gilbert; "Focus on Agere Systems's Orinoco PC Card"; International Journal of Network Management; Jan. 2002; pp. 187-193.

Jha, Uma S.; "Wireless Landscape—Need for Seamless Connectivity"; Wireless Personal Communications; 2002; pp. 275-283.

* cited by examiner

WIRELESS NETWORK ACCESS TECHNOLOGIES FOR RETRIEVING A VIRTUAL RESOURCE VIA A PLURALITY OF WIRELESS NETWORK INTERFACES

TECHNICAL FIELD

The described subject matter relates to electronic communication, and particularly to providing wireless network access.

BACKGROUND

Mobility is becoming an increasingly important aspect of computing. The advent of mobile computing devices such as, for example, laptop computers and handheld personal digital assistants (PDAs), coupled with the advent of the World Wide Web (WWW) has provided the technological infrastructure to permit users to access information and applications from many different locations across the world. Mobile access to computing resources expands the utility of these resources and increases the value of computer networks.

Presently, mobile connectivity is hampered by both a shortage and a lack of flexibility of wireless communication connections. Wireless communication networks were engineered primarily for voice communications. Accordingly, wireless communication connections are characterized by fixed, relatively low bandwidth connections. For example, wireless communication networks that operate in accordance with the GSM standard provide a connection having a fixed bandwidth that results in a maximum data rate of between 9600 and 14,400 bits per second, depending upon the particular variation of GPS connection. Wireless communication networks that operate in accordance with the CDMA standard provide similar data rates. While adequate for voice communications, these data rate restrictions limit the functionality of wireless connections for data networks. In addition, there may be gaps in the coverage of particular wireless service provider networks. Such gaps may be geographic, i.e., particular geographic areas may suffer from poor coverage. Alternatively, gaps may be a function of increased network traffic in a particular cell or sector of a network.

SUMMARY

Exemplary implementations described and claimed herein help address the limitations inherent in wireless communication connections by enabling the use of multiple, separate wireless communication connections to retrieve resources. Adroit management of multiple, separate wireless communication connections can greatly increase the bandwidth available for retrieving a resource. In addition, implementing multiple, separate wireless communication connections provides redundancy, which increases reliability.

In one exemplary implementation, a method is provided. The method comprises receiving a user request for a resource, activating at least one of a plurality of wireless communication connections, and transmitting a request for portions of the resource from the at least one activated wireless communication connection.

In another exemplary implementation, another method is provided. A request for a resource comprising a plurality of objects is received from a computing device. The request is terminated. A number of available wireless network interfaces and a number of objects in the resource are determined. Each object is assigned to a specific wireless network interface, and a request for the resource is transmitted. The request specifies the specific wireless network interface assigned to an object.

In another exemplary implementation, an apparatus is provided. The apparatus comprises at least one local communication network interface for receiving a request for a resource. In addition, the apparatus comprises a plurality of wireless network interfaces for transmitting resource requests over wireless communication connections. The apparatus further comprises a memory module, and a processor that executes logic instructions that configure the processor to terminate the received request, determine a number of available wireless network interfaces, determine a number of objects in the resource and the size of each object, and assign each object to at least one available wireless network interface.

DETAILED DESCRIPTION

Exemplary systems, methods, and computer program products are disclosed for providing wireless network access. A wireless network access device comprises a plurality of wireless network access interfaces for establishing a plurality of communication connections to one or more wireless networks. The wireless network access device also includes one or more local network interfaces for establishing local communication connections with mobile computing devices, e.g., laptop computers or PDAs. The wireless network access device further includes a processor, cache memory, and a communication bus for transmitting information from the local network interfaces to the wireless network interfaces. When executed on the processor, logic instructions enable the device to utilize a plurality of wireless network interfaces to transmit a resource request.

In practice, a wireless network access device may be secured to a mobile device such as a bus, train, automobile, boat, or an airplane. The local network interface(s) establish a local communication network so that users of mobile computing devices can establish a local communication link with the wireless network access device. When a mobile computing device requests a resource, the request is transmitted to the wireless network access device over the local communication network. The wireless network access device receives the request, activates at least one of the plurality of wireless network interfaces, and transmits the request across the activated interface(s). When the wireless network access device receives the requested resource, the wireless network access device forwards the resource to the requesting device using the local communication network.

In exemplary embodiments described herein, the resource is embodied as a page on a World Wide Web (WWW) web site. Thus, it is assumed that communications are exchanged using the TCP/IP suite of communication protocols. Information about the TCP/IP protocols is readily available. One useful reference is Stevens, TCP/IP Illustrated: The Protocols, Vol. 1, Addison Wesley (1994), the disclosure of which is incorporated herein by reference in its entirety.

A typical WWW resource (e.g., a web page) typically comprises multiple objects, each of which may be occupy a separate TCP connection during download. For example, a typical web page from CNN's web site may include a header, a section of text, a photo, a caption for the photo, a sidebar, and a graphic. When a user requests the web page, each of these objects may transferred to the user using a separate TCP connection.

Figure 1:
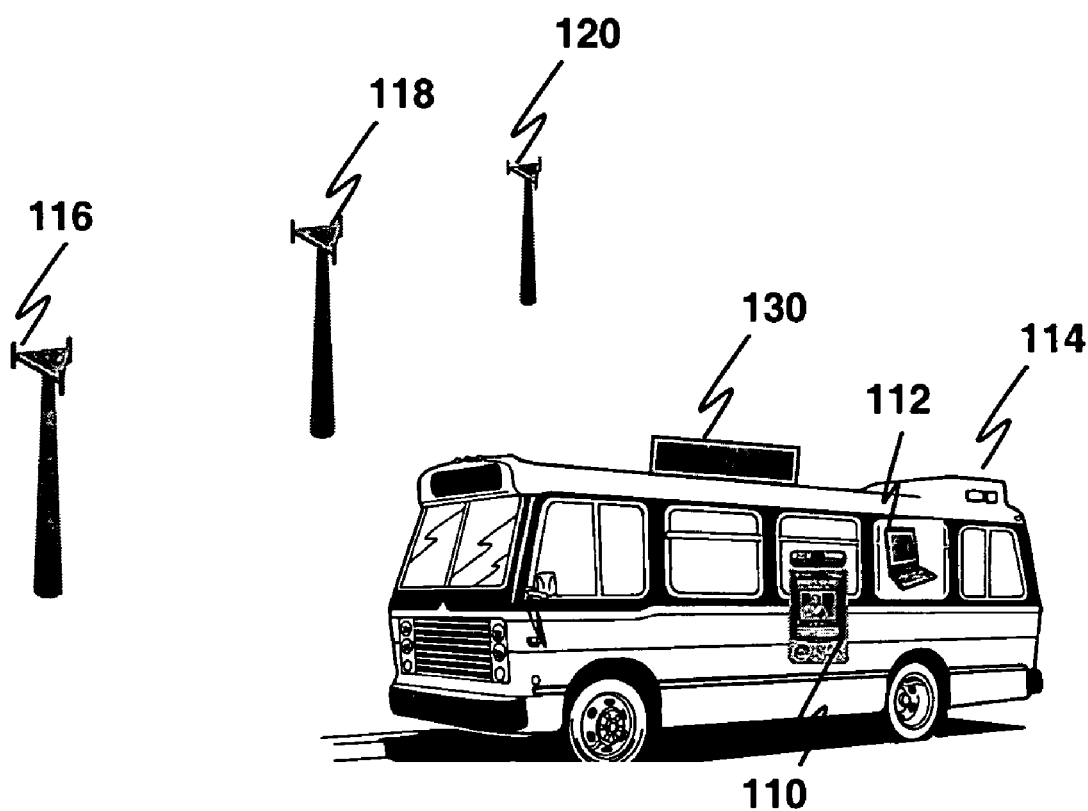
FIG. 1 is a schematic illustration of an exemplary wireless communication environment.

FIG. 1 is a schematic illustration of an exemplary wireless communication environment. Referring to FIG. 1, one or more users of mobile computing devices 110, 112 may reside in a mobile device, such as bus 114. The particular form of mobile computing device is not important. Exemplary mobile computing devices include laptop computers and PDAs.

At any point in time, bus 114 may reside in the coverage area of one or more wireless communication service providers. For example, at a given point in time bus 114 may be at a geographic location that receives wireless communication service from a plurality of wireless networks 116, 118, 120. Network 116 may represent Sprint wireless services, network 118 may represent AT&T Wireless, and network 120 may represent Verizon, In addition, bus 114 may receive access to a wireless data network, for example an 802.11b network.

As bus 114 moves, the wireless communication options available to its riders may change as a function of location. For example, bus 114 may leave the coverage area of a first network provider, but enter the coverage area of a second network provider. Alternatively, bus 114 may travel through an area in which a first network provider's coverage is poor, e.g., due to the location of base stations or obstacles between the base station and bus 114, but the coverage of another service provider remains strong. In addition, the wireless user options available to riders of bus 114 may change as a function of time. For example, the particular cell (or cell sector) of one or more network provider may be handling so many calls that it is at or near full capacity.

A wireless network access device 130 may be suitably secured to bus 114 to provide its users with wireless communication access. In an exemplary embodiment, wireless network access device 130 functions as a wireless gateway. Users obtain a local communication connection to the wireless network access device 130, which provides a communication link to wireless networks 116, 118, 120. The local communication connection may be a wired connection or a wireless connection.

Figure 2:
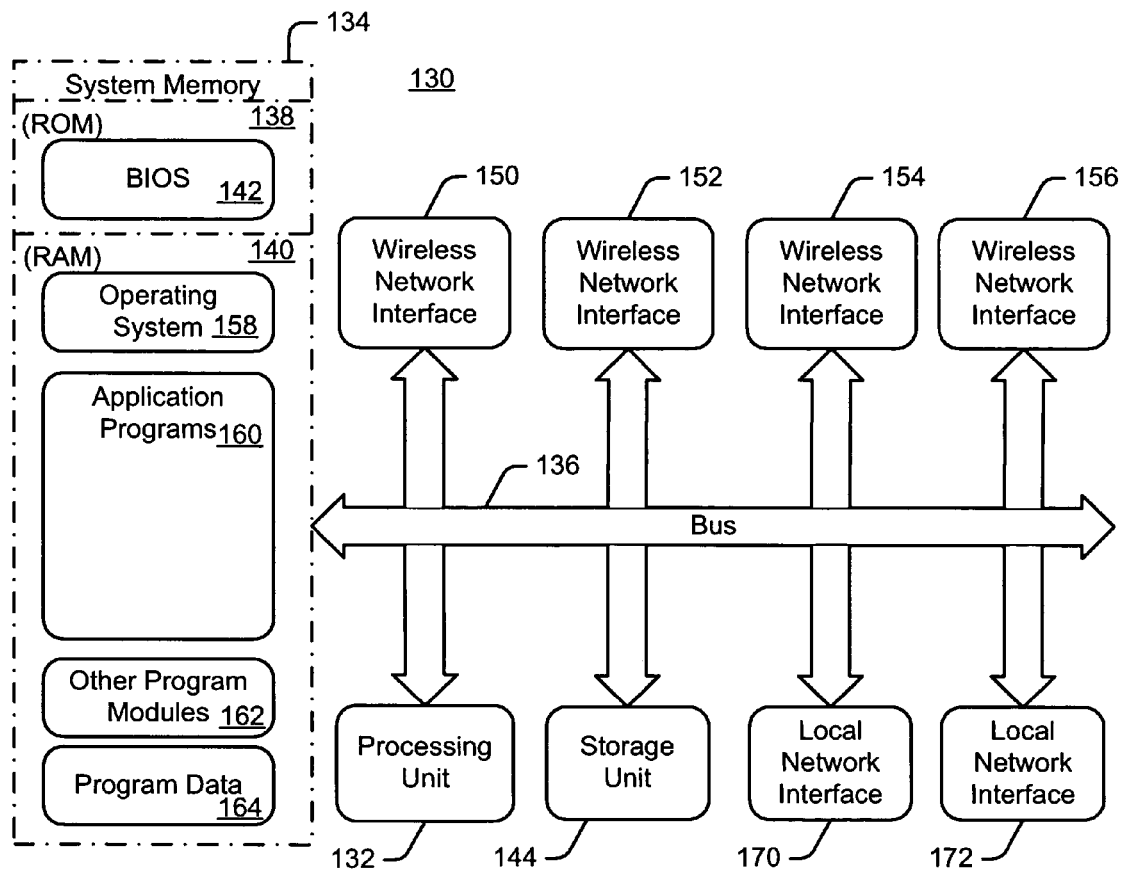
FIG. 2 is a schematic illustration of an exemplary wireless network access device.

FIG. 2 is a schematic illustration of an exemplary wireless network access device 130. Wireless network access device 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within wireless network access device 130, such as during start-up, is stored in ROM 138.

Wireless network access device 130 further includes a storage unit, e.g., a hard disk drive, 144 for reading from and writing to a hard disk. Optionally, wireless network access device may include other storage devices, for example, a magnetic disk drive for reading from and writing to a removable magnetic disk or an optical disk drive for reading from or writing to a removable optical disk. The storage unit 144, and any other storage mechanisms, is connected to the bus 136 by a suitable interface, for example, a SCSI interface. The storage unit and its associated computer-readable media provides nonvolatile storage of computer-readable instructions, data structures, program modules and other data for wireless network access device 130. Although the exemplary environment described herein employs a hard disk, other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the storage unit 144, including an operating system 158, one or more application programs 160, other program modules 162, and program data 164. Generally, the data processor(s) of wireless network access device 130 may be programmed by means of instructions stored at different times in the various computer-readable storage media of the computer. Programs may be loaded at least partially into the computer's primary electronic memory. The system described herein includes these and other various types of computer-readable storage media when such media contain instructions or programs for implementing the operations described below in conjunction with a microprocessor or other data processor. The system also includes the computer itself when programmed according to the methods and techniques described below.

Wireless network access device 130 comprises a plurality of wireless network access interfaces, designated in the drawing by reference numerals 150, 152, 154 and 156. While the specific embodiment illustrated in FIG. 2 includes four wireless network access interfaces, any number of interfaces may be used in practice. In an exemplary embodiment, wireless network access interfaces 150, 152, 154, and 156 may be embodied as PCMCIA (Personal Computer Memory Card International Association) cards, which provide access to a wireless communication network. Each card may be dedicated to a particular wireless communication service provider's network. For example, interface 150 may provide access to AT&T Wireless' network, interfaces 152 and 154 may provide access Sprint PCS' wireless network. Each of these interfaces represents node in the service provider's network. Wireless network access interface 156 may be embodied as a wireless PCMCIA card that provides access to a wireless data network using one of a plurality of wireless networking protocols, e.g., Bluetooth, or 802.11(b).

Wireless network access device further comprises at least one local network interface, and in the disclosed embodiment comprises multiple local network interfaces 170, 172. In an exemplary embodiment, wireless network access device 130 operates one or more local communication networks, such as a local area network (LAN). Local network interface 170 may be embodied as a wireless PCMCIA card that provides access to a wireless data network using one of a plurality of wireless networking protocols, e.g., Bluetooth, or 802.11(b). Local network interface 172 may be embodied as a PCMCIA card that provides access to a wired network, e.g., a LAN. Software for operating the local communication network may reside on the PCMCIA cards, or as one of the application programs 160 that execute on the processing unit 132 of wireless network access device 130.

The particular arrangement of the components illustrated in FIG. 2 is not critical. In an exemplary embodiment, wireless network access device 130 receives requests for resources from computing devices 110, 112 within range of its local wireless network, or connected to a wired local area network. Wireless network access device processes the requests, retrieves the requested resources, and transmits the requested resources to the local computing device 110, 112 that generated the request.

In operation, processing unit 132 spawns a process referred to herein as a parallel scheduler module. The parallel scheduler module is responsible for scheduling requests for resources, or particular objects within resources, over the various wireless network interfaces. In addition, in operation a portion of system memory 134 and/or storage unit 144 may be reserved as a cache memory.

Figure 3:
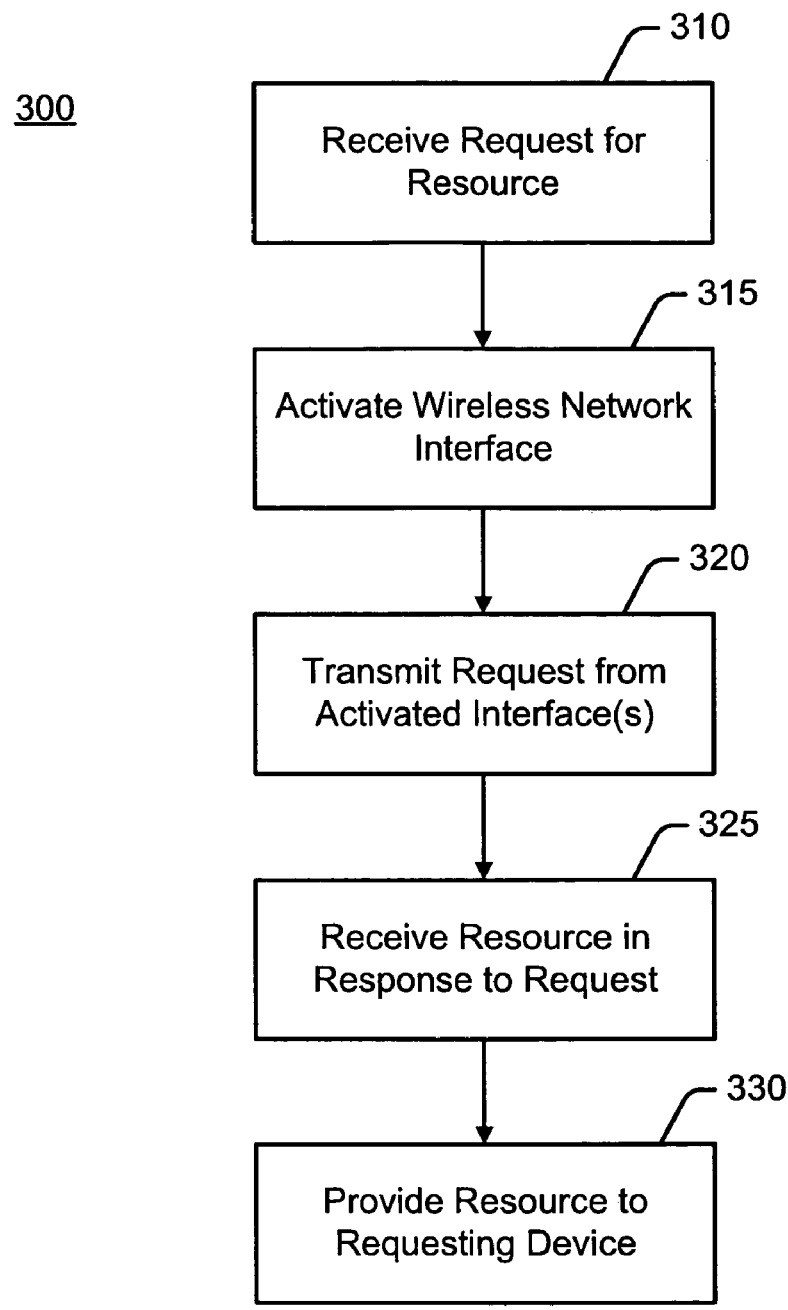
FIG. 3 is a flowchart illustrating an exemplary method of providing wireless network access.

FIG. 3 is a flowchart illustrating a first exemplary method of providing wireless network access. The operations 300 described in FIG. 3 may be embodied as logic instructions on a computer readable medium. When executed on the processing unit 132 in wireless network access device 130, the logic instructions configure the wireless network access device as a special purpose machine to execute the operations illustrated in FIG. 3. The operations of FIG. 3 will be described with reference to retrieving a web page from a web site on the World Wide Web.

Referring to FIG. 3, at operation 310 a request is received to retrieve a resource (e.g., a web page) that may comprise a plurality of objects. In practice, a request may originate from a mobile computing device 110, 112 being used by a rider of bus 114. In keeping with the TCP/IP protocol, the request specifies the source address, i.e., the internet address of the network interface that generated the request, and a destination address, i.e., the internet address of the server to which the resource request is to be transmitted. The resource request is transferred to wireless network access device 130 over the local communication network. As described above, the local communication network may comprise wired and/or wireless communication links.

At operation 315, in response to the request for the resource, wireless network access device 130 activates at least one wireless network interface to establish a wireless communication connection with an external network. In an exemplary embodiment, wireless access device 130 is configured to maximize the available bandwidth to users. Accordingly, wireless access device 130 activates all available wireless network interfaces to establish a plurality of wireless communication connections that may be spread among different communication service providers.

At operation 320, wireless network access device 130 transmits the request for the resource from the activated communication interface(s). If a plurality of interfaces were activated, then the resource request may be divided among the plurality of interfaces. For example, if a requested web page includes five objects, each of which requires a separate TCP connection, and there are five available communication interfaces, then each available wireless network interface may be assigned to transmit one a TCP connection. If the requested resource includes more objects than available wireless interfaces, then some wireless interfaces may be assigned multiple TCP connections. The TCP connections may be opened and closed independently.

The resource requests are transmitted across their respective wireless communication connections. The subsequent transmission and processing of the requests may be performed in accordance with conventional WWW transaction processing. This processing is outside the scope of this document, and will not be described in detail herein. Typically, a wireless network base station comprises a connection to a land-based network, such as a public switched telephone network (PSTN), or the internet. Resource requests received at a wireless base station are directed to the destination address across the land-based network(s) connected to the wireless base station. In response to the resource request, the computing device at the destination address (typically a server) transmits the resource to the requesting address.

At operation 325 the resource is received by the wireless network access device 130. If the resource comprises multiple objects transmitted over multiple TCP connections across different wireless network interfaces, then the portion of the resource on each TCP connection will be received independently. The portions of the resource may be stored in cache memory, or may be transmitted to the requesting computing device using the local network (operation 330).

Thus, the method illustrated in FIG. 3 enables a computing device within range of the local communication network to leverage the multiple wireless communication interfaces of wireless network access device 130. This increases the bandwidth and the reliability of the wireless communication link.

Figure 4:
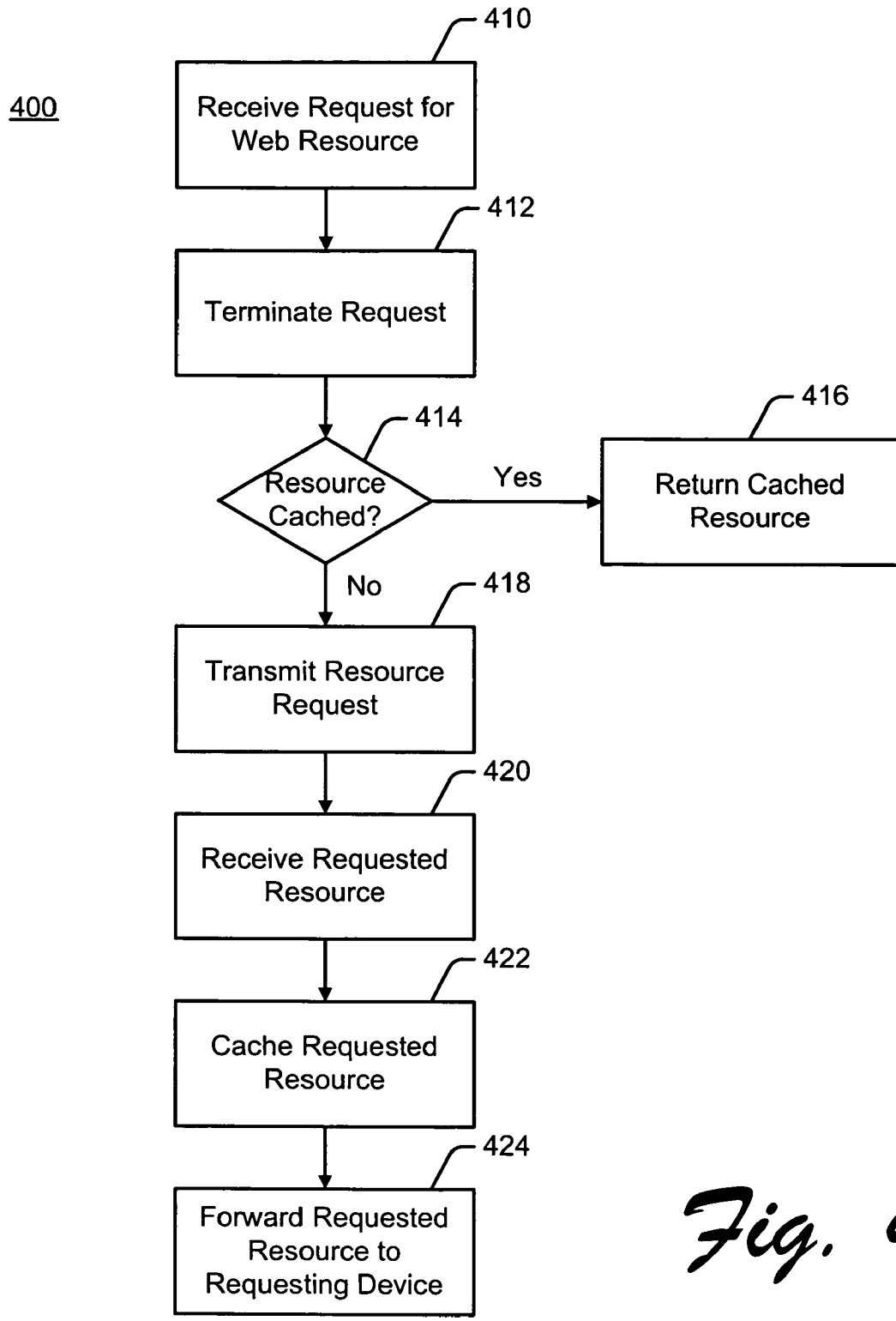
FIG. 4 is a flowchart illustrating another exemplary method of providing wireless network access.

FIG. 4 is a flowchart illustrating another exemplary method of providing wireless network access. Like the operations of FIG. 3, the operations 400 described in FIG. 4 may be embodied as logic instructions on a computer readable medium. When executed on the processor in wireless network access device 130, the logic instructions configure the wireless network access device as a special purpose machine to execute the method. The operations of FIG. 4 will also be described with reference to retrieving a web page from a web site on the World Wide Web.

Broadly, wireless network access device 130, when implementing the operations of FIG. 4, operates as a proxy server for resource requests that originate on the local communication network. Wireless network access device 130 receives requests and provides requested resources from local cache memory, if possible. Otherwise, wireless network access device 130 terminates the received resource request and determines a number of TCP connections to use for retrieving the resource. Wireless network access device 130 then generates a new resource request and opens separate TCP connections with the destination address over a plurality of the wireless communication interfaces. The resource is downloaded to the wireless network access device 130, which stores the resource in local cache memory and makes the resource available to the requesting device.

Referring to FIG. 4, at operation 410 a request is received to retrieve a resource, e.g., a web page. As described above, a request may originate from a mobile computing device 110, 112 being used by a rider of bus 114, and is transmitted to the wireless network access device using the local communication network.

At operation 412 the wireless network access device 130 terminates the received request. At operation 414 the wireless network access device determines whether the resource request can be satisfied from local cache memory. This may be accomplished using a variety of mechanisms. For example, when a resource is downloaded and stored in local cache memory, a time stamp identifying the time at which the resource was downloaded may be associated with the resource. Wireless network access device 130 may maintain a time threshold, and if the resource was received at a time less than the threshold, then the wireless network device 130 may provide the resource from local cache memory. The time threshold may be constant, or may be variable depending upon the nature of the resource. For example, a resource representing rapidly changing information such as stock prices may have a very low time threshold, even zero, while a resource representing slowly changing information such as weather may have a relatively high time threshold.

In an alternate embodiment, wireless network access device 130 may ping the server which provided a resource in its local cache memory to determine whether the resource is current. For example, wireless network access device 130 may request the time stamp associated with the most recent update of the resource on the server, and then may compare the received time stamp with the time stamp of the resource stored in local cache memory. If the resource has been updated since the resource was stored in local cache memory, then a new copy of the resource should be downloaded. This process may be performed periodically, for example as a background process. Alternatively, this process may be performed in response to a resource request.

If, at operation 414, it is determined that the requested resource may be provided from local cache memory, then control passes to operation 416, and wireless network access device returns the cached resource to the requesting computing device. Control can then pass back to operation 410.

By contrast, if the resource cannot be supplied from local cache memory, then control passes to operation 418, and the wireless network access device 130 transmits the resource request using one or more wireless network interfaces. In an exemplary embodiment, this is a multi-factored process implemented by the parallel scheduler module. Broadly, the parallel scheduler module monitors the availability and status of the wireless network interfaces in wireless network access device 130 and schedules requests on wireless network interfaces based on the size of the requested resource, the number of TCP connections included in the resource, and the number of available wireless network interfaces. Operation of the parallel scheduler module will be described with reference to FIGS. 5-6.

Figure 5:
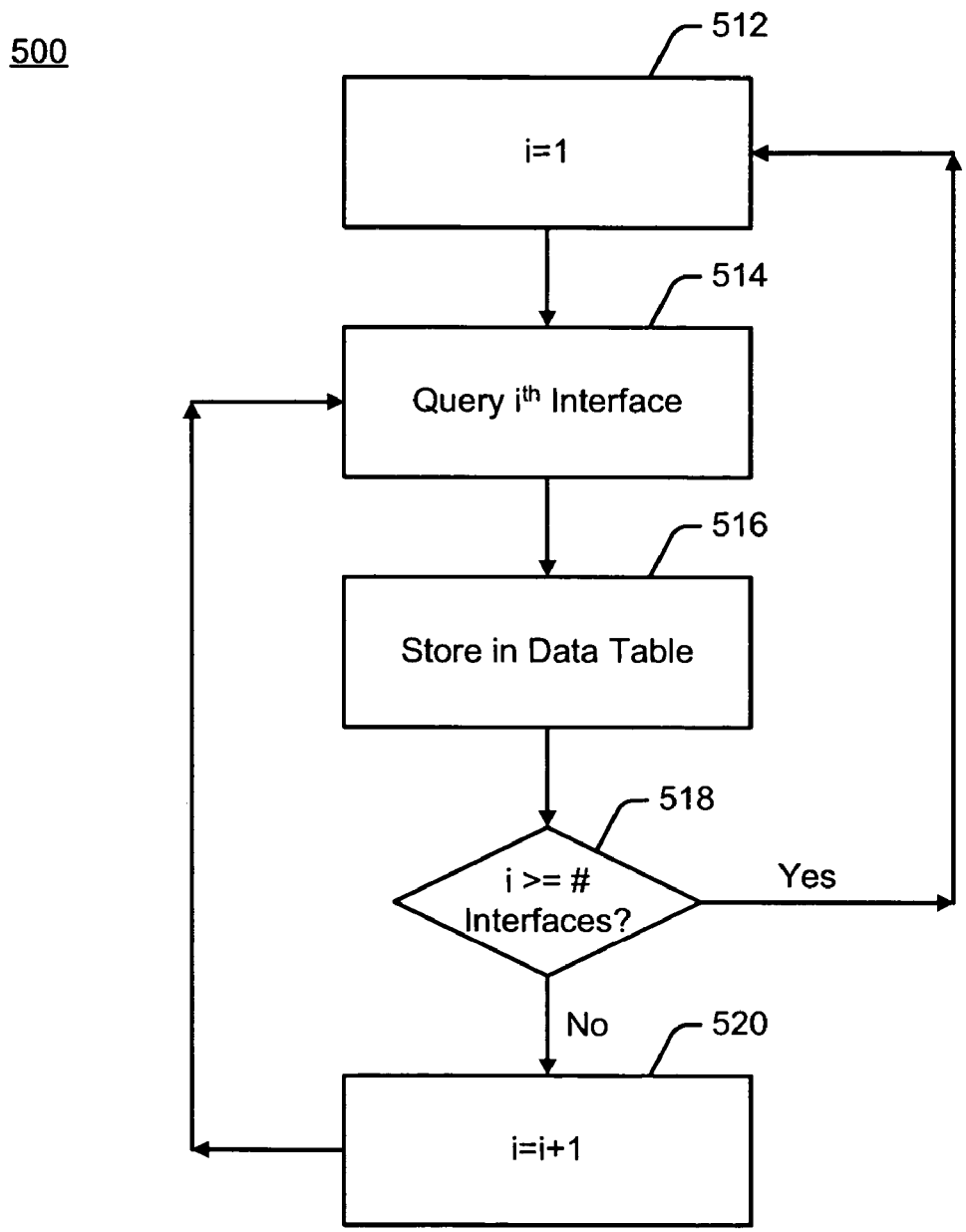
FIG. 5 is a flowchart illustrating an exemplary method for monitoring the availability and status of wireless network interfaces in wireless network access device 130.

FIG. 5 is a flowchart illustrating an exemplary method 500 for monitoring the availability and status of wireless network interfaces in wireless network access device 130. Broadly, the method queries each of the interface cards to determine status and availability information, and stores the information in a memory table. At step 512 a counter is set to a numeric value of 1. At operation 514 the parallel scheduler module queries the i$^{th}$ wireless network interface card to obtain status and availability information associated with the wireless network interface. In an exemplary embodiment, the parallel scheduler module may obtain information indicating one or more of the following: (1) whether the wireless network interface card is operational; (2) whether the wireless network interface card is currently connected to the network; (3) whether the wireless network interface card is available for use; (4) the signal strength of the wireless connection; (5) the signal-to-noise ratio of the connection; (6) the available bandwidth of the connection; or (7) the bit error rate (BER). A wireless network interface card may make this information available through API calls, which the parallel scheduler module may execute. This information may also be derived from application-level statistics collected for previous data downloads on each interface, e.g., average time to download an object through a given interface over the previous five downloads.

At operation 516, the parallel scheduler module stores the collected information in a data table in memory. At operation 518, the counter is compared to the total number of interface cards to determine whether all the network interface cards have been queried. If all network interface cards have been queried, then control passes back to step 512 and the counter is reset to 1. By contrast, if all network interface cards have not been queried, then control passes to step 520 and the counter is incremented. Control then passes back to operation 514, and the next card is queried.

Using the method of FIG. 5, the parallel scheduler module builds and maintains a data table that provides information about the availability and status of each of the wireless network interfaces. The operations of FIG. 5 may be executed periodically, e.g., as a background process. Alternatively, the operations of FIG. 5 may be event-triggered, e.g., when a resource request is received. The query process need not be sequential; other ordering criteria may be used.

Figure 6:
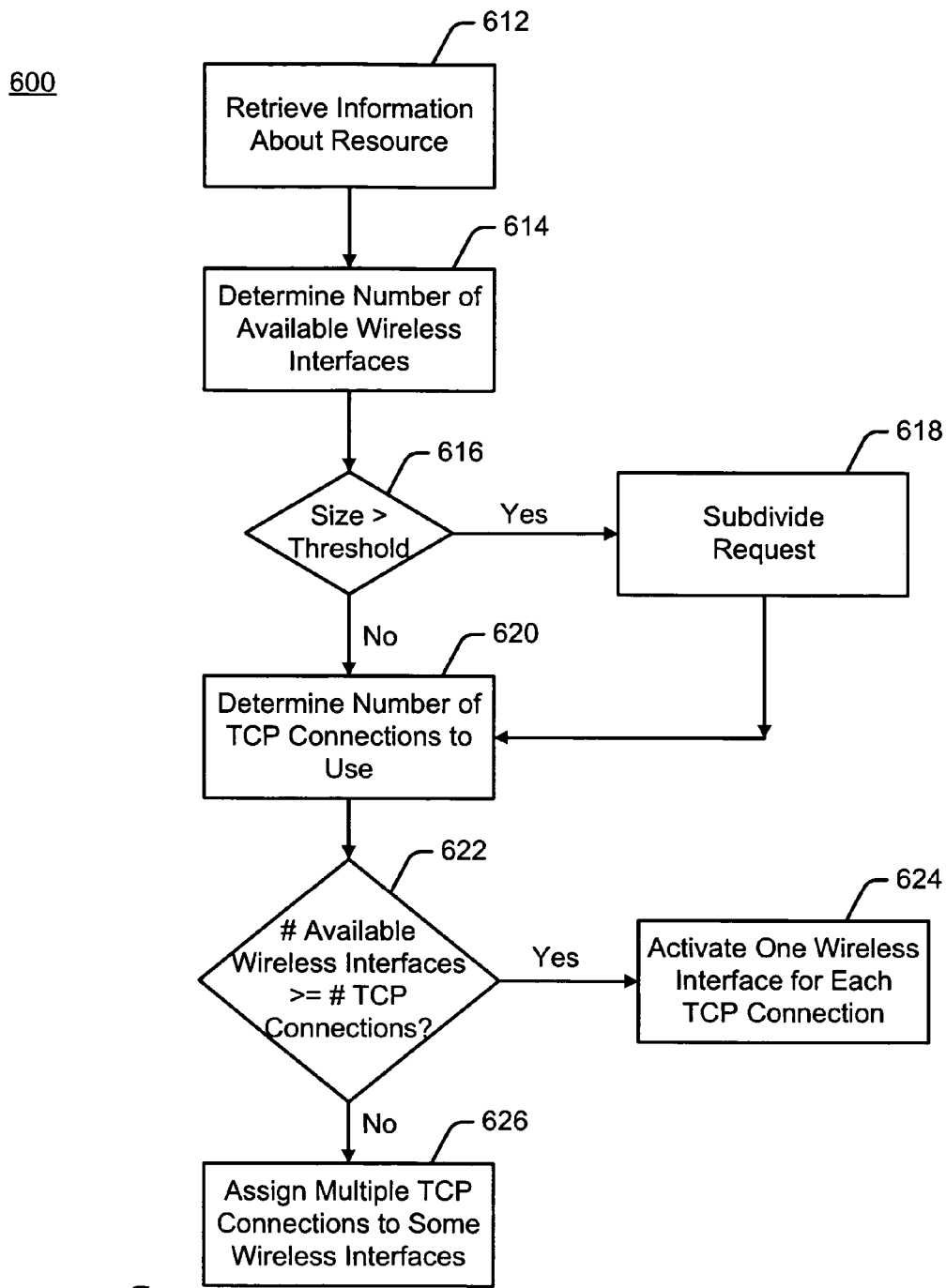
FIG. 6 is a flowchart illustrating an exemplary method for selecting a number of wireless network interfaces for use in transmitting a request.

The parallel scheduler module uses the information in the data table to select a number of wireless network interface cards for use in transmitting a request. FIG. 6 is a flowchart illustrating an exemplary method 600 invoked by the parallel scheduler module for selecting a number of wireless network interfaces for use in transmitting a request. At operation 612 the parallel scheduler module retrieves information associated with the requested resource. In an exemplary embodiment, the parallel scheduler module invokes a query to request the size of the resource, the number of separate objects included in the resource, and the size of each separate object. This query is transmitted across a wireless network interface, processed by the server that holds the resource, returned to the wireless network access device 130, and stored in a suitable memory location.

At operation 614, the parallel scheduler module determines the number of available wireless communication interfaces. In an exemplary embodiment, this operation may be performed by consulting the data table compiled using the operations in FIG. 5. In an alternate embodiment, this operation may be performed by querying the wireless network interface cards substantially in real-time to determine which wireless network interface cards are available.

At operation 616, the parallel scheduler module determines whether the size of an object(s) in the requested resource is above a threshold. This operation may be performed by comparing the object size information received in operation 612 with a threshold value. If the size of the resource is above a threshold, then control passes to operation 618, and the resource request may be subdivided into a plurality of different requests, each for a portion of the object, and control passes to operation 620. By contrast, if the size of the object does not exceed a threshold, then control simply passes to operation 620.

Operations 616-618 avoid downloading very large objects over a single TCP connection, which is transmitted across a single wireless network interface. Each wireless network interface has limited bandwidth. Therefore, downloading very large objects over a single TCP connection may unnecessarily delay the overall download time. Accordingly, the threshold may be set at a fixed number that is a function of the bandwidth available on a particular wireless network interface. Alternatively, the threshold may be set as a function of the size of a particular object in relation to the size of the other objects in the resource. For example, assume a particular resource includes five objects, one of which is a series of images that is ten times the size of the next largest object. The scheduler may break the series of images down into a number of individual objects that may be transmitted over separate TCP connections. Setting the threshold in this manner should reduce the total transmission time for the resource. It is possible to determine the threshold based on other factors; the thresholds described herein are merely exemplary.

Based on the number of objects in the resource and whether one or more objects were subdivided in operation 618, the parallel scheduler module determines a number of TCP connections to use in downloading the resource, at operation 620. For example, assume a resource includes five objects, but one object is subdivided into three separate TCP connections. The parallel scheduler module would assign seven TCP connections to download this resource.

If, at operation 622, the number of available wireless network interfaces meets or exceeds the number of TCP connections assigned to download the resource, then control passes to operation 624, and the parallel scheduler module activates one network interface card for each TCP connection. By contrast, if at operation 622 the number of TCP connections assigned to download the resourced exceeds the number of available wireless network interfaces, then control passes to operation 626, and the parallel scheduler module assigns multiple TCP connections to the same wireless network interface.

The subsequent transmission and processing of the resource request may be performed in accordance with conventional WWW transaction processing. This processing is outside the scope of this document, and will not be described in detail herein. As described in connection with FIG. 3, resource requests received at a wireless communication network base station are typically routed onto a "wireline" network, e.g., using a gateway. The request is processed by the server, returned to the base station and transmitted across the wireless network.

Referring again to FIG. 4, at operation 420 the requested objects are returned to the wireless network access device and are received over the selected interfaces. At operation 422 the received objects are collated and stored in a cache memory to reflect the requested resource. And at operation 424 requested resource is transmitted to the computing device that originated the request.

In operation, wireless network access device 130 executes the operations in FIGS. 4-6 repeatedly. As a result, the cache memory compiles resources that have been downloaded. Therefore, cache memory may need to be managed to avoid an overflow condition. In an exemplary embodiment, cache memory may be purged on a periodic basis. In an alternate embodiment, cache memory may be purged of resources that are older than a threshold amount. For example, cache memory may be purged of all resources downloaded more than six hour ago. These memory management methods are merely exemplary; other memory management methods may be used.

The operations of FIGS. 4-6 enable the wireless network access device 130 to make dynamic decisions about allocating TCP connections to wireless network interfaces based on substantially real-time characteristics of the wireless communication links. For example, wireless network interfaces that exhibit poor communication link characteristics (e.g., low available bandwidth, high signal-to-noise ratio, high congestion, etc.) may be assigned fewer connections to manage, or may be removed from operation entirely. By contrast, wireless network interfaces that exhibit strong communication link characteristics (e.g., high available bandwidth, low signal-to-noise ratio, low congestion, etc.) may be assigned more connections to manage. Typically, this function would be performed by the parallel scheduler module. By monitoring the performance of the wireless network interfaces and efficiently allocating transmission resources, wireless network access device 130 can maximize, or at least increase, the bandwidth available to users of the system.

In addition, wireless network access device 130 can dynamically reallocate wireless transmission resources when the performance of one or more wireless network interfaces changes. For example, assume the bus travels into a geographic area in which one wireless communication service provider's network coverage fails. The fading signal will be detected by the parallel scheduler module during execution of the operations of FIG. 5. If the signal fades below a threshold, then the parallel scheduler module may reschedule the resource request(s) on affected wireless network interfaces onto other unaffected (or less affected) wireless network interfaces. The particular threshold may be a matter of design choice, and may be constant or may variable. For example, the parallel scheduler module may execute logic that transfers traffic from a wireless network interface in an amount that is proportional to the signal degradation. Alternatively, the parallel scheduler module may simply compare the signal strength of the impaired wireless network interface(s) with the signal strength of other available wireless network interface(s), and reallocate the traffic to the wireless network interface(s) that are stronger. This may involve switching traffic from one service provider to another.

Wireless network access device 130 can also dynamically reallocate wireless transmission resources to balance the load among the various wireless network interface cards. In a simple example, the parallel scheduler module can monitor the buffer of each wireless network interface, and can shift traffic from wireless network interfaces with long buffers to wireless network interfaces with short buffers. In a more complex example, the parallel scheduler module can monitor buffer length and the connection's data rate to obtain a better view of the effective buffer length, and can reallocate traffic to wireless network interfaces with low effective buffer lengths. These methods are merely exemplary; other methods may be used.

Although the described arrangements and procedures to reconcile file systems interconnected components have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method for retrieving a virtual resource from a remote computer via a plurality of wireless network interfaces, comprising:

receiving via a local communications network at a local network interface of a wireless network access device, from a local computing device coupled to the local communications network, an incoming request for the virtual resource, the virtual resource being a web page, wherein the virtual resource comprises a plurality of objects, the plurality of objects being elements of the web page;

determining a number of available wireless network interfaces of the plurality of wireless network interfaces of the wireless network access device, each of the plurality of wireless network interfaces communicatively coupled to a distinct wireless network of a plurality of wireless networks that communicatively couple the wireless network access device to the remote computer;

determining a number of objects in the virtual resource sufficient to retrieve the virtual resource and return it to the local computing device;

assigning by the wireless network access device each object in the virtual resource to at least one of the available wireless network interfaces, at least one object in the virtual resource being assigned to a different available wireless network interface than another object in the virtual resource;

activating the available wireless network interfaces to which objects of the virtual resource have been assigned; and transmitting from the wireless network access device an outgoing request to the remote computer for each object in the virtual resource, each outgoing request corresponding to the incoming request, wherein each outgoing request is transmitted via the available wireless network interface to which the corresponding object in the virtual resource is assigned, and wherein each object in the virtual resource is downloaded from the remote computer in a conventional manner, responsive to the outgoing requests, to the wireless network access device via the corresponding assigned wireless network interface, the method being performed by a processor of the wireless network access device, wherein the wireless network access device is an individual device that includes the plurality of wireless network interfaces, the local network interface, and the processor, the local network interface distinct from any of the plurality of wireless network interfaces.

2. The method of claim 1, wherein determining a number of available wireless network interfaces comprises monitoring one or more characteristics of each of the plurality of wireless network interfaces.

3. The method of claim 1, wherein determining a number of available wireless network interfaces comprises monitoring one or more characteristics of each of the plurality of wireless network interfaces, wherein a signal characteristic is selected from a group of signal characteristics comprising: signal-to-noise ratio, available bandwidth, congestion, signal strength, connection cost, and bit error rate.

4. The method of claim 1, wherein determining a number of available wireless network interfaces comprises monitoring one or more characteristics of each of the plurality of wireless network interfaces stored in a data table in memory.

5. The method of claim 1, wherein determining a number of available wireless network interfaces comprises querying the wireless network interfaces.

6. The method of claim 1, wherein the determining a number of objects in the virtual resource comprises querying the remote computer.

7. The method of claim 1, wherein the assigning comprises assigning an object to two or more of the available wireless network interfaces if the size of the object exceeds a threshold.

8. The method of claim 1, wherein the assigning comprises assigning an object to two or more available wireless network interfaces if the size of the object exceeds a threshold, wherein the threshold is a function of the bandwidth of the available wireless network interfaces.

9. The method of claim 1, wherein the assigning comprises assigning an object to two or more available wireless network interfaces if the size of the object exceeds a threshold, wherein the threshold is a function of the size of an object relative to the size of other objects in the virtual resource.

10. The method of claim 1, further comprising
collating the received objects to construct the virtual resource.

11. The method of claim 10, further comprising:
transmitting the collated virtual resource to the computing device that originated the incoming request.

12. A computer-readable medium having computer-executable instructions for performing the method recited in claim 1.

13. An apparatus, comprising:
at least one local communication network interface for receiving a request for a virtual resource, the virtual resource being a web page, wherein the virtual resource comprises a plurality of objects, the plurality of objects being elements of the web page;

a plurality of wireless network interfaces, each of the plurality of wireless network interfaces communicatively coupled to a distinct wireless network of a plurality of wireless networks that communicatively couple the apparatus to a remote computer, the remote computer including the virtual resource;

a memory module; and a processor executing logic instructions that cause the apparatus to:
determine a number of available wireless network interfaces of the plurality of wireless network interfaces of the apparatus;

determine a number of objects in the virtual resource sufficient to retrieve the virtual resource and return it to the local computing device;

assign each object in the virtual resource to at least one of the available wireless network interfaces, at least one object in the virtual resource being assigned to a different available wireless network interface than another object in the virtual resource; and transmit an outgoing request to the remote computer for each object in the virtual resource, wherein each outgoing request is transmitted via the available wireless network interface to which the corresponding object in the virtual resource is assigned, each outgoing request corresponding to the incoming request, and wherein each object in the virtual resource is downloaded from the remote computer in a conventional manner, responsive to the outgoing requests, to the apparatus via the corresponding assigned wireless network interface, wherein the apparatus is an individual device that includes the plurality of wireless network interfaces, the local network interface, the memory module, and the processor, the local network interface distinct from any of the plurality of wireless network interfaces.

14. The apparatus of claim 13, wherein the at least one local communication network interface comprises a wireless network interface.

15. The apparatus of claim 13, wherein the processor polls the wireless network interfaces to determine characteristics of the communication connections managed by the wireless network interfaces.

16. The apparatus of claim 13, wherein the processor polls the plurality of wireless network interfaces on a periodic basis to determine characteristics of communication connections managed by the plurality of wireless network interfaces.

17. The apparatus of claim 13, wherein the processor polls the plurality of wireless network interfaces in response to a received request to determine characteristics of communication connections managed by the plurality of wireless network interfaces.

18. The apparatus of claim 13, wherein the processor assigns objects to wireless network interfaces according to an algorithm that maximizes bandwidth.

19. The apparatus of claim 13, wherein the processor assigns multiple wireless network interfaces to objects that exceed a size threshold.

20. The apparatus of claim 13, wherein the processor assigns multiple wireless network interfaces to objects that exceed a size threshold that is a function of the available bandwidth on one or more wireless network interfaces.

21. The apparatus of claim 13, wherein the processor assigns multiple wireless network interfaces to objects that exceed a size threshold that is a function of the size of an object relative to other objects in the virtual resource.

22. The apparatus of claim 13, wherein the processor is further configured to receive requested objects transmitted across at least some of the plurality of wireless networks.

23. The apparatus of claim 13, wherein the processor is further configured to receive requested objects transmitted across at least some of the plurality of wireless networks, and to transmit received objects over the local communication network interface.

* * * * *